US 11,762,565 B2

(12) United States Patent
Palmer

(10) Patent No.: US 11,762,565 B2
(45) Date of Patent: *Sep. 19, 2023

(54) RESET INTERCEPTION TO AVOID DATA LOSS IN STORAGE DEVICE RESETS

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,356

(22) Filed: Mar. 22, 2022

(65) Prior Publication Data

US 2022/0214818 A1 Jul. 7, 2022

Related U.S. Application Data

(63) Continuation of application No. 16/236,785, filed on Dec. 31, 2018, now Pat. No. 11,287,986.

(51) Int. Cl.
*G06F 3/06* (2006.01)

(52) U.S. Cl.
CPC ............ *G06F 3/0619* (2013.01); *G06F 3/068* (2013.01); *G06F 3/0659* (2013.01)

(58) Field of Classification Search
CPC ...... G06F 3/0619; G06F 3/0659; G06F 3/068; G06F 3/0605; G06F 3/0632; G06F 3/0679; G06F 3/0658; G06F 2212/7203; G06F 12/0246; G06F 21/78
See application file for complete search history.

(56) References Cited

U.S. PATENT DOCUMENTS

| 5,175,845 A * | 12/1992 | Little | G06F 11/0757 |
| | | | 714/E11.005 |
| 9,459,802 B1 * | 10/2016 | Budiman | G06F 3/0619 |
| 9,996,291 B1 | 6/2018 | Izhar et al. | |
| 10,180,792 B1 * | 1/2019 | Gaertner | G06F 11/1441 |
| 2003/0212864 A1 * | 11/2003 | Hicken | G06F 11/2092 |
| | | | 714/E11.092 |
| 2005/0283648 A1 | 12/2005 | Ashmore | |

(Continued)

FOREIGN PATENT DOCUMENTS

| CN | 102959525 | 3/2013 |
| CN | 107003919 | 8/2017 |
| CN | 111382465 A | 7/2020 |

OTHER PUBLICATIONS

"Chinese Application Serial No. 201911402173.5, Office Action dated Jan. 19, 2023", with English translation, 13 pages.

*Primary Examiner* — Ramon A. Mercado
(74) *Attorney, Agent, or Firm* — Schwegman Lundberg & Woessner, P.A.

(57) ABSTRACT

Apparatus and methods are disclosed, including a controller circuit, a volatile memory, a non-volatile memory, and a reset circuit, where the reset circuit is configured to receive a reset signal from a host device and actuate a timer circuit. The timer circuit, where the timer circuit is configured to cause a storage device to reset after a threshold time period. The reset circuit is further configured to actuate the controller circuit to write data stored in the volatile memory to the non-volatile memory before the storage device is reset.

20 Claims, 4 Drawing Sheets

(56) References Cited

U.S. PATENT DOCUMENTS

| | | | |
|---|---|---|---|
| 2007/0033431 A1* | 2/2007 | Pecone | G06F 1/28 |
| | | | 714/6.12 |
| 2010/0205348 A1 | 8/2010 | Moshayedi et al. | |
| 2014/0189234 A1* | 7/2014 | Tang | G06F 12/0868 |
| | | | 711/113 |
| 2016/0179667 A1* | 6/2016 | Kumar | G06F 11/0778 |
| | | | 711/135 |
| 2016/0239431 A1* | 8/2016 | Li | G06F 12/1009 |
| 2016/0350015 A1* | 12/2016 | Luo | G06F 12/0246 |
| 2017/0010933 A1* | 1/2017 | Wang | G06F 11/0757 |
| 2018/0314464 A1* | 11/2018 | Shen | G06F 3/0604 |
| 2020/0110555 A1* | 4/2020 | Hsiao | G06F 3/0679 |
| 2020/0210073 A1 | 7/2020 | Palmer | |
| 2022/0214818 A1* | 7/2022 | Palmer | G06F 3/0658 |

* cited by examiner

RESET INTERCEPTION TO AVOID DATA LOSS IN STORAGE DEVICE RESETS

PRIORITY APPLICATION

This application is a continuation of U.S. application Ser. No. 16/236,785, filed Dec. 31, 2018, which is incorporated herein by reference in its entirety.

TECHNICAL FIELD

Embodiments of the present disclosure relate generally to computer storage systems, more particularly, but not by way of limitation, to intercepting reset signals to delay a reset event, to avoid data loss in storage device resets.

BACKGROUND

Computer storage systems can use one or more data storage devices to store or retrieve data that is generated or operated on by host computing systems. Such storage devices can include one or more storage controllers that use a combination of firmware and hardware components to facilitate the movement of data between a host computing system and storage media associated with the storage devices. A storage device, however, can be become deadlocked, or can otherwise malfunction in a way that can cause the storage device to become unresponsive to commands issued by a host computing system. To enhance the reliability of computing systems, storage devices can incorporate functionally that reset these devices in response to receiving a reset signal from host system.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
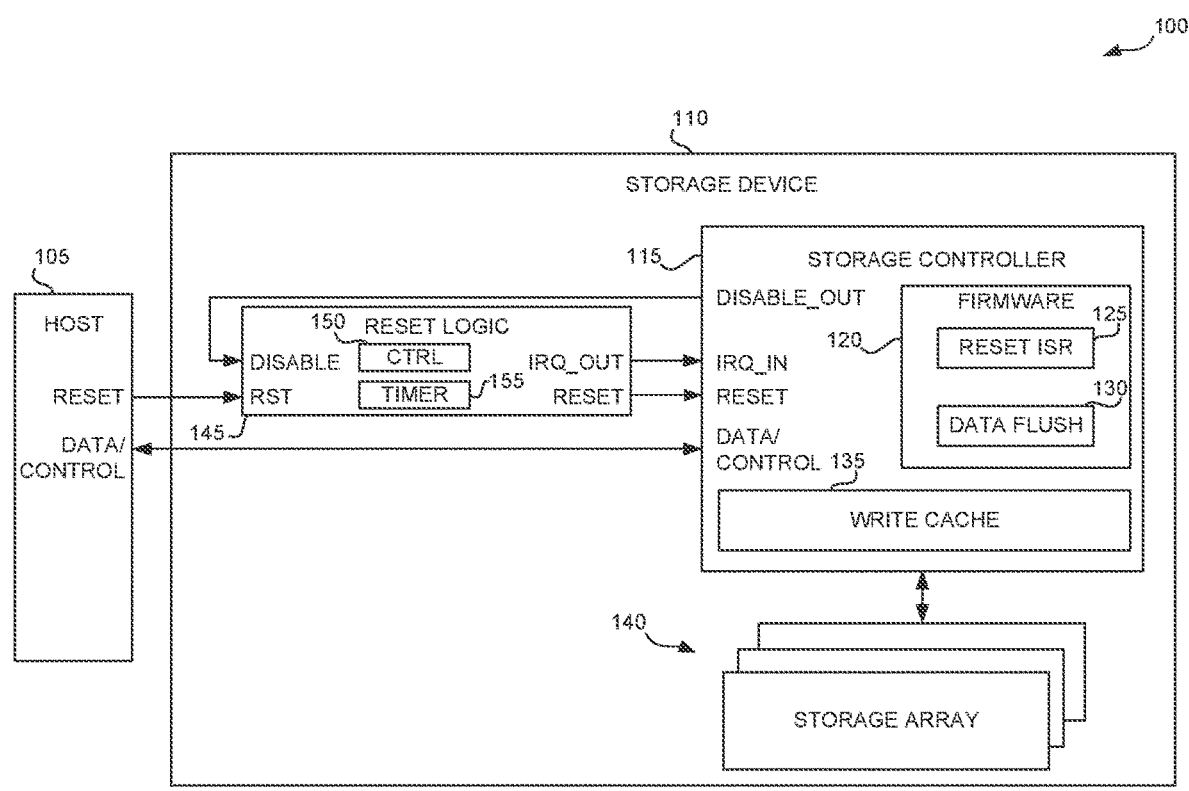
FIG. 1 illustrates an example host system including a host device and a storage system, in accordance with examples of the present disclosure.

Aspects of the present disclosure are directed to limiting, or reducing, data loss in storage systems during a storage device reset. In operation, a storage device can receive data from a host device to write to a storage medium. Writing such data directly to a storage medium can be expensive, such as in terms of time, energy, and other computing resources used to execute the write operation. In an example, a storage device can include a solid-state drive (SSD) having arrays of flash memory cells as a storage medium. Each write to the array of flash memory cells can consume a lot of time and energy because such write operations can require write data to be presented to the array for an indicated threshold time while the cells are actuated at a relatively high voltage. Additionally, partial writes, such as write operations that do not include enough data to fill a string to memory cells of a specified length, can waste storage, while frequent writes can reduce the useful lifetime of the storage media. A storage device can reduce the costs associated with executing such write operations by temporarily storing write data received from a host device in a memory buffer, a cache, or other volatile memory (collectively referred to hereinafter as a "write cache"). Data in the write cache can then be written to a storage medium at a time specified by one or more storage or cache management algorithms.

In some situations, a storage device can malfunction, or can otherwise be perceived as unresponsive to host commands. In these situations, a host device can transmit a reset signal to the storage device to cause the storage device to perform a reset. For purposes of the present description, a reset operation is one that either expressly results in flushing of any data within a write cache, or inherently creates a risk of loss of data within a write cache. Performing a reset can include immediately resetting internal logic circuits, memory circuits (e.g., volatile memory circuits), and or other components of a storage device to put the storage device to a specified operating state. In some situations, a host device can trigger a reset in a normally functioning storage device, such as a storage device that is still under the control of programmed firmware being executed by its storage controller. Data that is stored in a write cache these devices, and waiting to be written to a storage medium, can be lost when a storage device executes the reset.

Aspects of the present disclosure are based on the inventor's recognition that unwritten data stored in a write cache of a functioning storage device can be preserved by intercepting a reset signal transmitted by a host device and causing the storage device to write the unwritten data to a storage medium before executing a reset. Accordingly, the present disclosure includes techniques (e.g., systems, methods, machine readable storage media) for intercepting reset signals to limit, or avoid, data loss in storage device resets. Such techniques can include intercepting a reset signal transmitted by a host device to a storage device, such as to prevent the storage device from immediately executing a reset. Such techniques can also include starting a timer to delay the reset for an indicated or threshold amount of time. Such techniques can also include triggering, such as in response to receiving a reset signal or in response to starting the timer, a processor interrupt such as to cause a storage controller, or other control circuit associated with the storage device, to disable the timer, write the unwritten data to the storage medium, and execute the reset (e.g., a soft reset or a hard reset) after writing the unwritten data.

FIG. 1 illustrates an example host system 100 including a host device 105 and a storage device 110, in accordance with examples of the present disclosure. The host system 100 can be any computing system configured with devices that generate, store, access, or otherwise operate on, or communicate, digital data. The host system 100 can be a standalone computing system, such as a server. The host system 100 can also be a distributed computing system, including one or more host devices 105 and storage devices 110.

The host device 105 can be a device that is associated with the host system 100 and configured to write data to, or to read data from, the storage device 110. The host device 105 can include a host processor, a central processing unit, or one or more other computing device, processor, controller, or control circuitry. The host device 105 can also include a communication interface (I/F), such as a bidirectional parallel or serial communication interface, to communicate with the storage device 110 or the host system 100. Examples of the communication interface can include, but are not limited to, a serial advanced technology attachment (SATA) interface, a peripheral component interconnect express (PCIe) interface, universal serial bus (USB) interface, Fibre Channel, Serial Attached SCSI (SAS), an eMMC™ interface, etc. Such communication interface can include one or more control or data channels (e.g., a DATA/CONTROL), such as to enable the host device 105 to transfer data between the host device and the storage device 110. Such communication interface can also include a RESET channel, such as for transmitting a reset signal to the storage device 110. In an example, the RESET channel can include a physical electrical conductor that couples the host device 105 to a reset port or interface of the storage device 110.

The storage device 110 can be in the form of, or can include, a universal flash storage (UFS) device, an embedded MMC (eMMC™) device, or one or more other memory devices. For example, if the storage device 110 includes a UFS device, the communication interface used to couple the host device 105 to the storage device can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage device 110 includes an eMMC device, the communication interface used to couple the host device 105 to the storage device can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage device 110 can include one or more other memory devices, or the communication interface used to couple the host device 105 to the storage device.

The storage device 110 can include a storage controller 115, and storage array 140, and reset logic 145. In some examples, the reset logic 145 can be a component of the storage controller 115. Generally, the storage device 110 can be in the form of, or at least include, a discrete storage device, such as a system on chip (SOC); or an integrated storage device and controller (examples of which are devices compliant with the above-discussed UFS or eMMC specifications, or an SSD), and can be configured to perform the operations and techniques described herein.

The storage controller 115 can include a processor (processing device) or other control circuitry configured to execute firmware instructions 120 to perform the operations and techniques described herein. In some examples, the storage controller 115 can be a microcontroller, special purpose logic circuitry (e.g., a field programmable gate array (FPGA), an application specific integrated circuit (ASIC), etc.), or other suitable processor. The storage controller 115 can include a firmware instructions or circuitry 120, buffer memory, such as write cache 135, and other hardware circuits, such as one or more integrated circuits and/or discrete components. The storage controller 115 can receive instructions from the host device 105, and can communicate with the storage array 140, such as to transfer data to (e.g., write or erase) or from (e.g., read) the storage array.

The firmware 120 can include computer code or instructions that are executable by the storage controller 115 to perform operations to transfer data to, or from, the storage array 140. In some examples, the firmware 120 can be encoded in one or more hardware circuits associated with the storage controller 120. The firmware 125 can include, amongst other things, a reset interrupt service routine (ISR) 125, and a data flush routine 140. In some examples, the reset ISR 125 and the data flush routine 140 can be included in the same firmware routine.

The reset ISR 125 can include firmware instructions that are executed by the storage controller 115 in response to actuation of the storage controller input port, or pin, IRQ_IN. Such actuation can include driving IRQ_IN with any signal that can be detected by the storage controller 115 and used to trigger execution of the reset ISR 125. The storage controller 115 can be configured to trigger a processor interrupt when IRQ_IN is actuated. An interrupt vector associated with the triggered processor interrupt can be configured to cause the storage controller 115 to suspend other processes being executed by the storage controller and to execute the reset ISR 125. The reset ISR 125 can include instructions that, when executed, causes the storage controller 115 to disable a timer circuit 155 in the reset logic 145, such as by actuating the storage controller output port, or pin, disable_out. In some examples, the reset ISR 125 can allow the timer in the reset logic 145 to continue to run. In these examples, firmware instructions in the reset ISR can be executed to cause the storage controller to adjust a current count, or a target count, of the timer, such as to delay the reset of the storage device 110. The reset ISR 125 can also include firmware instructions that, when executed, causes the storage controller 115 to execute the data flush routine 130.

The data flush routine 130 can include firmware instructions that, when executed, causes the storage controller 115 to write unwritten data (e.g., data received from the host device 105 for writing to the storage device 110, but which has not been written to the storage array 140) stored in the write cache 135 to the storage array 140.

Either the reset ISR 125, the data flush routine 130, or another firmware routine included in the firmware 120, can include firmware instructions that, when executed, causes the storage controller 115 to reset the storage device 110 after the unwritten data stored in the write cache 135 is written to the storage array 140. In some examples, the storage controller 115 can reset the storage device 110 by reenabling the timer circuit 155 in the reset logic 145 and allowing the timer to expire (e.g., allowing the timer to count up to, or down from, a target value). In certain examples, the storage controller 115 can reset the storage device 110 by allowing a timer circuit in the reset logic 145, when the timer is not disabled by the reset ISR 125, to expire, such as by not adjusting the current value of the timer or the target value of the timer. In other examples, the storage controller can reset the storage device 110 by actuating one or more hardware circuits that are configured to execute the reset.

Returning the discussion of the components of the storage controller 115, the write cache 135 can include an array of memory cells to which data can be written at a lower cost than writing data to the storage array 140. In an example, the write cache 135 can include arrays of static memory, such as an array of static random access memory (SRAM). In other examples, the write cache 135 can include arrays of dynamic random access memory (DRAM) or persistent memory, such as randomly addressable memory that is preserved through a power cycle. The write cache 135 typically includes volatile memory, but some non-volatile memory technologies can be used in the write cache provided that such technologies enable data to be written at a lower cost (e.g., faster) than the cost for writing data to the storage array 140.

The storage array 140 can be configured to provide non-volatile storage for data received from the host device 105. Such non-volatile storage can be provided by one or more types of non-volatile memory devices, such as NAND flash memory devices or NOR flash memory devices. Such non-volatile memory devices can include one or more arrays of memory cells such as single-level cells (SLCs) or multi-level cells (MLCs) (e.g., triple-level cells (TLCs) or quad-level cells (QLCs)). In some conventional industry usage, the term MLC has been used to identify memory cells that can store two bits of data per cell (e.g., one of four programmed states); but is also utilized in a broader context to refer to memory cells that can store more than one bit of data per cell (i.e., that can represent more than two programmed states). Unless clearly indicated otherwise by express language or context, MLC is used herein in the broader context and includes, for example, TLC and QLC memory cells. Each of the memory cells can be configured to store bits of data (e.g., data blocks) received from the host device 105. In some examples, the storage array 140 can include random access memory (RAM), such as battery-backed RAM. In other examples, the storage array 140 can include read-only memory (ROM), phase change memory (PCM), magneto random access memory (MRAM), and electrically erasable programmable read-only memory (EEPROM).

The reset logic 145 can include one or more circuits or firmware instructions for intercepting a reset signal from the host device 105 and causing the storage device 110 to write unwritten data stored in the write cache 135 to the storage array 140 before executing a reset, as described herein. The reset logic 145 can include control logic 150 and a timer 155. The control logic 150 can include one or more circuits to receive, or intercept, a reset signal transmitted by the host device 105 to the storage device 110.

In an example, the control logic 150 can also include one or more circuits to initialize the timer 155 with an indicated value, such as a number of timer ticks or units of time that must pass before the reset logic 145 executes a reset. In some examples, the timer 155 can include a decrementing counter, and initializing the timer can include storing a countdown value in the counter and triggering the timer to periodically decrement the counter. In some examples, the timer 155 can include a up counter and a target value register or other storage element, and initializing the timer can include storing an indicated value in the target counter and triggering the timer to start counting up to the indicated value. Once initialized the timer circuit 155 can count for an indicated time period. At the end of the indicated time period, the timer circuit 155 can trigger, or cause, an automatic reset of the storage device 115. The automatic reset, however, can be avoided by disabling the timer 155 before the indicated time period.

In another example, the control logic 150 can include one or more circuits for generating an interrupt in the storage controller 115, such as by actuating the IRQ_OUT signal. The control logic 150 can actuate the IRQ_OUT signal in response to receiving the reset signal form the host device 105. In some examples, the control logic 150 can actuate the IRQ_OUT signal at substantially the same time that the timer 155 is initialized. Such one or more circuits can also cause the reset logic 145 to determine that the timer 155 has expired (e.g., the timer counted down to zero, or a value of the timer reached an indicated timer value) and trigger the execution of the reset, such as by actuating one or more circuits in the controller 115, or the one or more circuits in the storage device 110, to execute the reset.

In operation, the host device 105 can execute data transfer operations to write data to, or to read data from, the storage device 110. The storage controller 115 can service the data transfer operation on the behalf of the storage device 110, such as by executing firmware 120 to write data to, or to read data from, the storage array 140. The storage controller 115 can service data write operations issued by the host device 105 by executing the firmware 120 to buffer or store write data associated with one or more write operations in the write cache, and then write the buffered write data to the storage array according to an indicated write data caching algorithm.

The host device 105 can monitor the communication interface between the host device and the storage device 110, such as to determine whether the storage device is functioning or communicating normally. The storage device 110 can appear to be malfunctioning, or can appear to not be communicating normally, when, amongst other things, communications between the host device 105 and the storage device is interrupted, such as because the storage controller is deadlocked or there is interference on the communication interface.

The host device 105 can issue a hardware reset to the storage device 110 in response to determining that the storage device 110 is malfunctioning, or is not communicating normally, or for other reasons. The reset logic 145 can intercept the reset signal and initialize and start the timer 115. The reset logic 150 can also trigger an interrupt in the storage controller 115 at substantially the same time that the timer 155 is initialized or started.

If the storage controller 115 is function normally (e.g., the storage controller is able to respond to processor interrupts), the reset ISR 125 can service the interrupt by disabling the timer 155 and executing the data flush routine 130 to write unwritten data stored in the write cache 135 to the storage array 150. Firmware in the storage controller 115 can then be executed to cause the storage device 110 to execute the reset.

If the storage controller 115 is deadlocked or otherwise malfunctioning (e.g., the storage controller is not able to respond to processor interrupts), the timer 155 will continue to tick or count until the timer expires (e.g., until threshold time period has elapsed) or an indicated timeout value is reached. The reset logic 150 can then cause the storage device 110 to execute the reset, as described herein.

Figure 2:
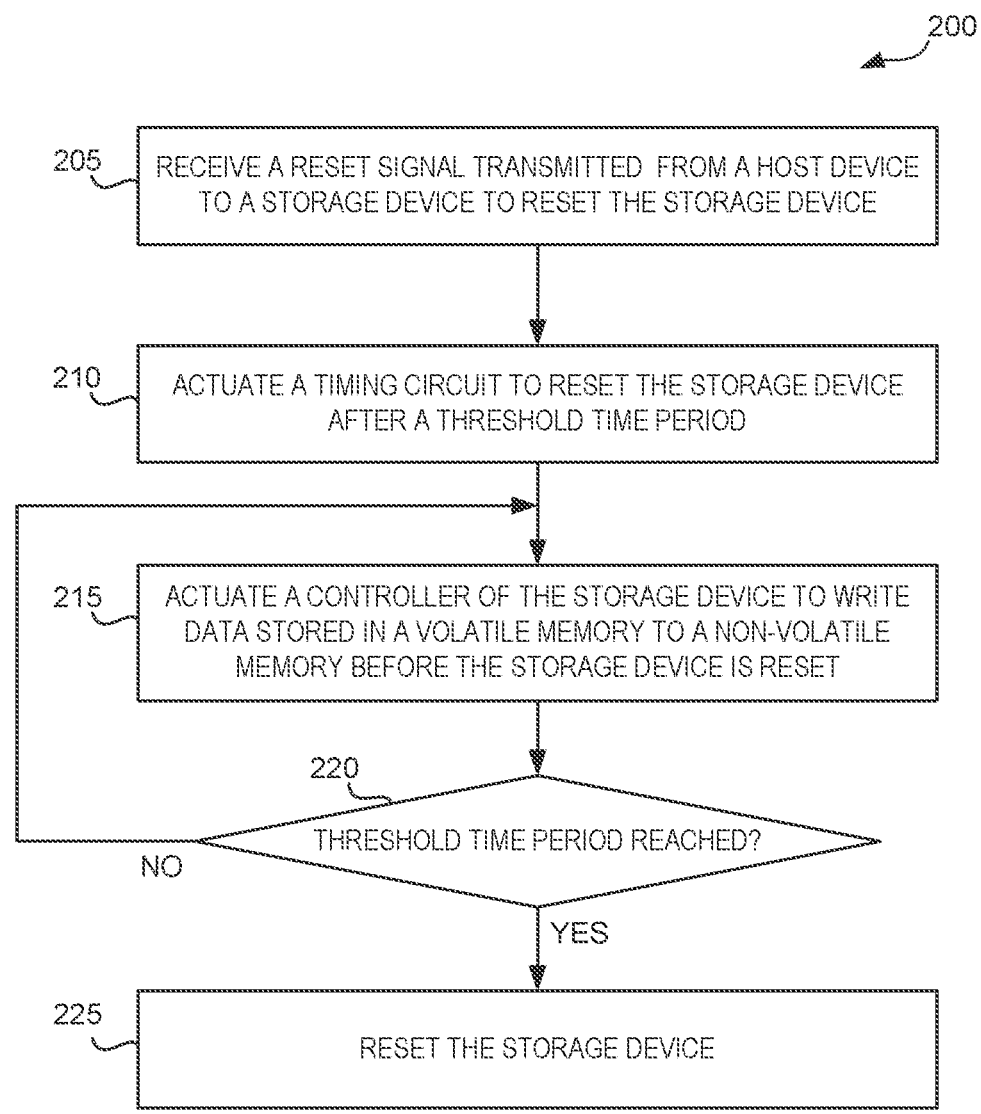
FIG. 2 illustrates an example a process for intercepting a reset signal from a host device to avoid data loss in a storage device reset, in accordance with examples of the present disclosure.

FIG. 2 illustrates an example a process 200 for intercepting a reset signal from a host device to avoid data loss in a storage device reset, in accordance with examples of the present disclosure. The host device can be an example of the host device 105 (FIG. 1), while the storage device can be an example of the storage device 110 (FIG. 1). The process 200 can be executed by hardware circuits or firmware components of the storage device.

At 205, a reset signal, such as a reset signal, can be received from a host device. The host device can transmit the reset signal in response to the determining that the storage device is malfunctioning or not communicating properly, or for another reason.

At 210, a timer can be actuated to cause the storage device to rest after a threshold time period. Actuating the timer can include initializing the timer to count up to, or down from, an indicated value, as described herein.

At 215, the storage device can be actuated to write data stored in a write cache or volatile memory associated with a storage controller of the of the storage device to a storage array or other non-volatile memory coupled to the storage controller before resetting the storage device. Actuating the storage device can include triggering an interrupt in the storage controller to transfer process execution in the storage controller to an ISR, such as the reset ISR 125 (FIG. 1). If the controller is functioning, the reset ISR can then cause the storage controller to disable the timer, write unwritten data stored a write cache of the storage controller to non-volatile memory, and reset the storage controller, as will be described in the discussion of FIG. 3.

At 220, if the timer was not disabled at operation 215, it can be determined whether the timer indicates that are threshold time period for delaying the reset was reached. Determining whether the threshold time period was reached can include determining whether a counter associated with the timer has incremented to an indicated value, or determining whether a counter associated with the timer has sufficiently decremented from an indicated value. The process 200 can be continued at 215 when the timer was not disabled and threshold time period has not been reached, while the process can proceed to operation 225 when the timer was not disabled and threshold time period has been reached.

At 225 a reset operation can be executed to reset the storage device, as described herein.

In some examples, the process 300 can be executed instead of operations 220 and 225, such as when a healthy (e.g., normally functioning) storage controller disables the timer at 215. In other examples, operations 220 and 225 can be executed instead of the process 300, such as when a malfunctioning storage controller fails to respond or deactivate the timer at 215.

Figure 3:
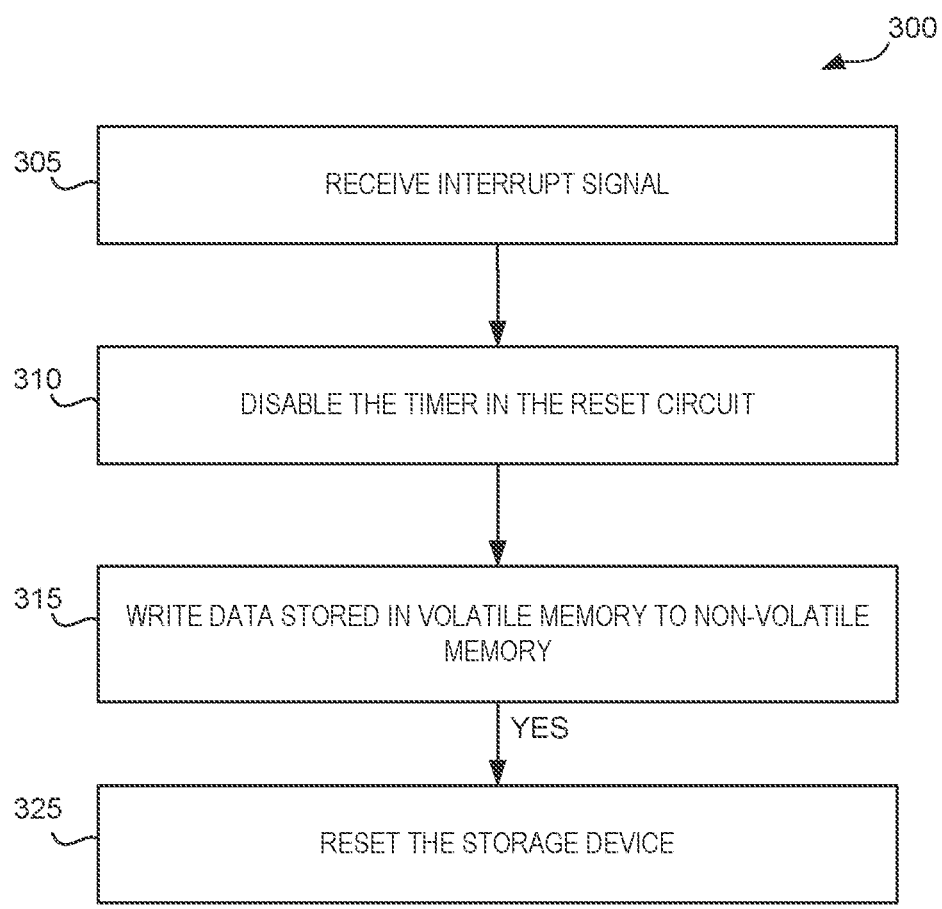
FIG. 3 illustrates an example a process for responding to a reset signal to avoid data loss in a storage device reset, in accordance with examples of the present disclosure.

FIG. 3 illustrates an example a process for responding to a reset signal to avoid data loss in a storage device reset, in accordance with examples of the present disclosure. As discussed herein, the operations 300 can be executed by a storage controller, such as the storage controller 115, to actuate the storage device to write data stored in the volatile memory to the non-volatile memory before resetting the storage device, as shown in operation 215 (FIG. 2).

At 305, the storage controller can receive a signal that generates a processor interrupt. The signal can be received from a reset logic component of a storage device, such as the reset logic component 145 (FIG. 3). The storage controller can be configured to case the received signal to generate the highest priority interrupt serviceable by the storage controller, such as to cause the storage controller to immediately suspend execution of any current processes to service the triggered interrupt.

At 310, the storage controller can disable the reset timer, such as to prevent the automatic reset of the storage device at the expiration of the rest timer.

At 315, the storage controller can write (e.g., flush) unwritten data stored in a write cache (e.g., volatile memory) of the storage controller, such as the write cache 135 (FIG. 1), to a non-volatile storage medium associated with the storage controller, such as the storage array 140.

At 320, the storage device can be reset, as described herein.

Figure 4:
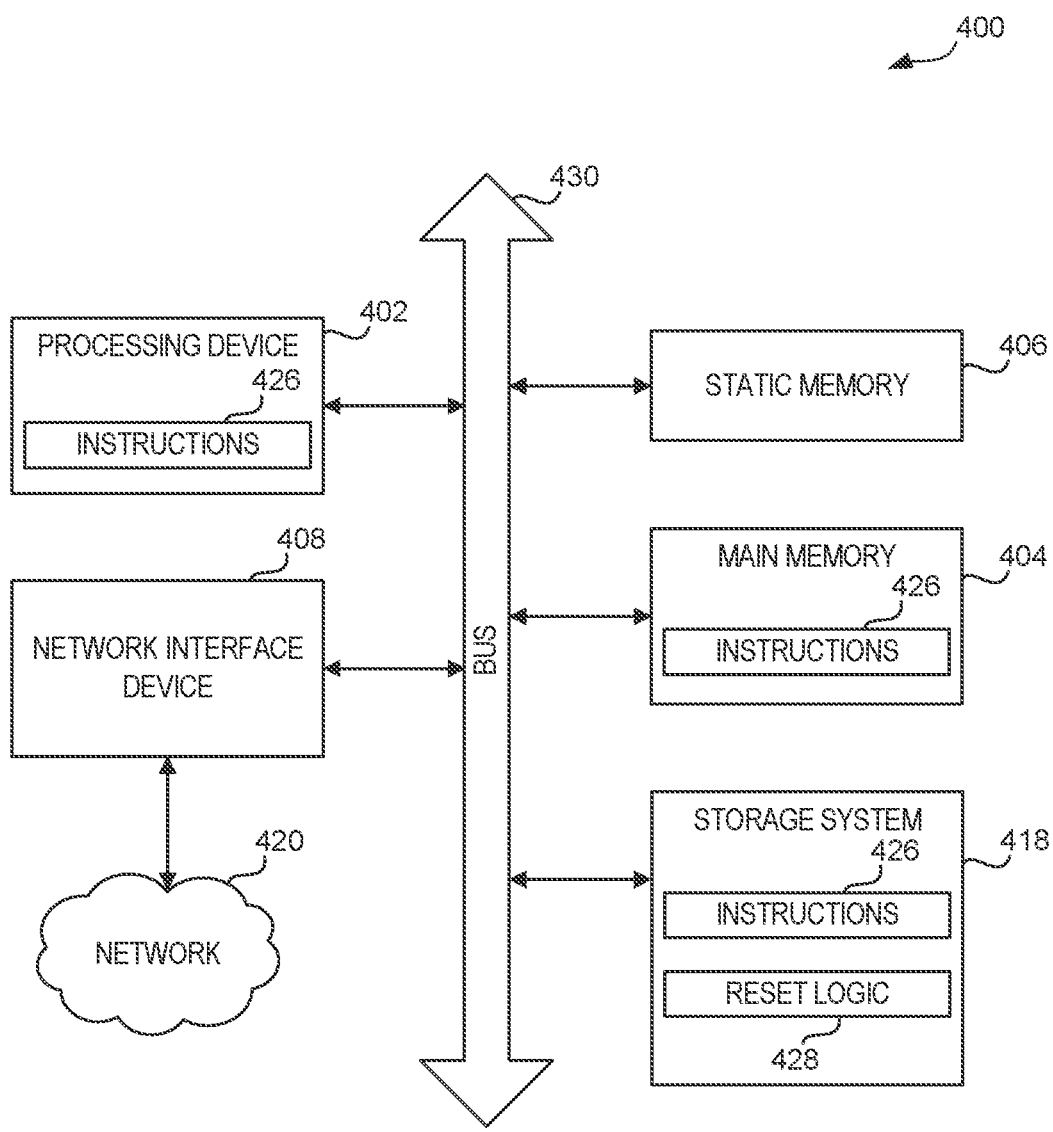
FIG. 4 illustrates an example a computer system having a data storage system to perform any one or more of the processes or techniques discussed herein, in accordance with examples of the present disclosure.

FIG. 4 illustrates an example a computer system 400 having a data storage device to perform any one or more of the processes or techniques discussed herein, in accordance with examples of the present disclosure. The computer system 400 can be an example of the host system 100 (FIG. 1), while the data storage device can be an example to the storage device 110 (FIG. 1).

In alternative embodiments, the machine 400 can operate as a standalone device or can be connected (e.g., networked) to other machines. In a networked deployment, the machine 400 can operate in the capacity of a server machine, a client machine, or both in server-client network environments. In an example, the machine 400 can act as a peer machine in peer-to-peer (P2P) (or other distributed) network environment. The machine 400 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that may, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system, a host system, etc.) 400 can include a processing device 402 (e.g., a hardware processor, a central processing unit (CPU), a graphics processing unit (GPU), a hardware processor core, or any combination thereof, etc.), a main memory 404 (e.g., read-only memory (ROM), dynamic random-access memory (DRAM) such as synchronous DRAM (SDRAM) or Rambus DRAM (RDRAM), etc.), a static memory 406 (e.g., static random-access memory (SRAM), etc.), and a storage system 418, some or all of which can communicate with each other via a communication interface (e.g., a bus) 430.

The processing device 402 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 can be configured to execute instructions 426 for performing the operations and steps discussed herein. The computer system 400 can further include a network interface device 408 to communicate over a network 420.

The storage system 418 can include a machine-readable storage medium (also known as a computer-readable medium) on which is stored one or more sets of instructions 426 or software embodying any one or more of the methodologies or functions described herein. The storage system 418 can also include reset logic component 428, which can be configured according to the techniques and methodologies of the present disclosure, such as perform the operations of the reset logic component 145. The instructions 426 can also reside, completely or at least partially, within the main memory 404 or within the processing device 402 during execution thereof by the computer system 400, the main memory 404 and the processing device 402 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 400 can further include a display unit, an alphanumeric input device (e.g., a keyboard), and a user interface (UI) navigation device (e.g., a mouse). In an example, one or more of the display unit, the input device, or the UI navigation device can be a touch screen display. The machine a signal generation device (e.g., a speaker), or one or more sensors, such as a global positioning system (GPS) sensor, compass, accelerometer, or one or more other sensor. The machine 400 can include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 426 (e.g., software, programs, an operating system (OS), etc.) or other data are stored on the storage system 418 can be accessed by the main memory 404 for use by the processing device 402. The main memory 404 (e.g., DRAM) is typically fast, but volatile, and thus a different type of storage than the storage system 418 (e.g., an SSD), which is suitable for long-term storage, including while in an "off" condition. The instructions 426 or data in use by a user or the machine 400 are typically loaded in the main memory 404 for use by the processing device 402. When the main memory 404 is full, virtual space from the storage system 418 can be allocated to supplement the main memory 404; however, because the storage system 418 device is typically slower than the main memory 404, and write speeds are typically at least twice as slow as read speeds, use of virtual memory can greatly reduce user experience due to storage system latency (in contrast to the main memory 404, e.g., DRAM). Further, use of the storage system 418 for virtual memory can greatly reduce the usable lifespan of the storage system 418.

The instructions 424 can further be transmitted or received over a network 420 using a transmission medium via the network interface device 408 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 408 can include one or more physical jacks (e.g., Ethernet, coaxial, or phone jacks) or one or more antennas to connect to the network 420. In an example, the network interface device 408 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on"(in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

As used herein, the term actuate and operate can be used interchangeably, such as to indicate operations, or activity that causes a physical or logical change in the state of a signal, a circuit, or data object.

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Example 1 is a storage system comprising: a controller circuit comprising a volatile memory; a non-volatile memory; and a reset circuit, the reset circuit configured to: receive a reset signal from a host device; actuate a timer circuit, the timer circuit configured to cause the storage device to reset after a threshold time period; and actuate the controller circuit to write data stored in the volatile memory to the non-volatile memory during the threshold time period.

In Example 2, the subject matter of Example 1 is optionally configured such that to actuate the controller circuit, the reset circuit is configured to generate an interrupt signal to interrupt a process executed by the controller circuit; and in response to receiving the interrupt signal, the controller circuit is configured to write the data stored in the volatile memory to the non-volatile memory.

In Example 3, the subject matter of any of Examples 1-2 is optionally configured such that in response to receiving the signal, the controller circuit is configured to disable the timer circuit to prevent an automatic reset of the storage device in response to expiration of the threshold time period.

In Example 4, the subject matter of any of Examples 1-3 is optionally configured such that in response to receiving the interrupt signal, the controller circuit is configured to reset the storage device after writing the data stored in the volatile memory to the non-volatile memory.

In Example 5, the subject matter of any of Examples 1-4 is optionally configured such that the data stored in the volatile memory comprises host data received from the host device, the controller circuit configured to temporarily store the host data in the volatile memory before writing the host data to the non-volatile memory.

In Example 6, the subject matter of any of Examples 1-5 is optionally configured such that the controller circuit comprises the reset circuit.

In Example 7, the subject matter of any of Examples 1-6 is optionally configured such that the reset circuit comprises the timer circuit.

In Example 8 is a method comprising: receiving a reset signal at a storage device; after receiving the reset signal, the storage device counting for a threshold time period before resetting the storage device; and after receiving the reset signal and during the threshold time period, writing data stored in a volatile memory of the storage device to a non-volatile memory of the storage device before the storage device is reset.

In Example 9, the subject matter of Example 8 is optionally configured such that the storage device comprises a controller which includes the volatile memory; and comprising: suspending execution of one or more processes of the controller; and causing the controller to write the data stored in the volatile memory to the non-volatile memory.

In Example 10, the subject matter of any of Examples 8-9 is optionally configured such that suspending execution of one or more processes comprises causing a processor interrupt in the controller.

In Example 11, the subject matter of any of Examples 8-10 is optionally configured to cause the controller to reset the storage device after writing the data stored in the volatile memory to the non-volatile memory.

In Example 12, the subject matter of any of Examples 8-11 is optionally configured to cause the controller to prevent an automatic reset of the storage device in response to expiration of the threshold time period.

In Example 13, the subject matter of any of Examples 8-12 is optionally configured to cause the controller to extend the threshold time period.

In Example 14, the subject matter of any of Examples 8-13 is optionally configured to resetting the storage device in response to expiration of the threshold time period.

In Example 15 is a machine-readable storage medium that provides instructions that, when executed by a controller of a storage device cause the storage device to perform operations comprising: receiving a reset signal; after receiving the reset signal, counting for a threshold time period before resetting the storage device; and after receiving the reset signal and during the threshold time period, writing data stored in a volatile memory of the storage device to a non-volatile memory of the storage device before the storage device is reset.

In Example 16, the subject matter of Example 15 is optionally configured such that the operations comprise suspending execution of one or more processes of a controller in the storage device and causing the controller to write the data stored in the volatile memory to the non-volatile memory.

In Example 17, the subject matter of any of Examples 15-16 is optionally configured such that suspending execution of one or more processes comprises causing a processor interrupt in the controller.

In Example 18, the subject matter of any of Examples 15-17 is optionally configured such that the operations comprise causing the controller to reset the storage device after writing the data stored in the volatile memory to the non-volatile memory.

In Example 19, the subject matter of any of Examples 15-18 is optionally configured such that the operations comprise causing the controller to prevent an automatic reset of the storage device at the expiration of the threshold time period.

In Example 20, the subject matter of any of Examples 15-19 is optionally configured such that the operations comprising resetting the storage device in response to expiration of the threshold time period.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory device, comprising:
   a non-volatile memory array;
   a volatile memory array;
   a communication interface comprising a first reset input configured to receive a first reset signal from an external device;
   a storage controller comprising a second reset input and a processor operable to execute instructions to perform operations of the memory device; and
   reset logic interposed between the first reset input of the communication interface and the second reset input of the storage controller, and the reset logic including a disable input configured to receive a disable command from the storage controller, the reset logic configured to:
   receive the first reset signal from the external device;
   responsive to receiving the first reset signal from the external device, (1) actuate a timer circuit to measure a specified threshold time duration and (2) initiate transfer of data from the volatile memory array to the non-volatile memory array;
   responsive to receiving the disable command from the storage controller, deactivating the timer circuit; and
   responsive to the specified threshold time duration elapsing and in absence of receiving the disable command from the storage controller at the disable input, provide a second reset signal to the second reset input of the storage controller to trigger reset of the memory device.

2. The memory device of claim 1, wherein the storage controller comprises the reset logic.

3. The memory device of claim 1, wherein the memory device is a Universal Flash Storage (UFS) device, and wherein the non-volatile memory array comprises one or more NAND memory devices.

4. The memory device of claim 1, wherein the reset logic is configured to provide an interrupt signal to an interrupt input of the storage controller in response to receiving the first reset signal at the first reset input; and
   responsive to receiving the interrupt signal at the interrupt input, the storage controller is configured to interrupt a current routine of the memory device and initiate a reset routine of the memory device.

5. The memory device of claim 4, wherein the reset routine includes a data flush routine to transfer data from the volatile memory array to the non-volatile memory array.

6. The memory device of claim 4, wherein responsive to the interrupt signal, the storage controller is configured to provide the disable command to the reset logic to deactivate the timer circuit.

7. The memory device of claim 4, wherein responsive to the interrupt signal, the storage controller is configured to reset the memory device after transfer of the data from the volatile memory array to the non-volatile memory array.

8. The memory device of claim 1, wherein the reset logic is configured to initiate the transfer of data from the volatile memory array to the non-volatile memory array during or within the specified threshold time duration.

9. The memory device of claim 1, wherein the volatile memory array comprises a static random access memory (SRAM) write cache.

10. The memory device of claim 1, wherein the storage controller comprises a timer disable output configured to provide the disable command to the reset logic to disable the timer circuit.

11. The memory device of claim 1, wherein the storage controller is configured to change the specified threshold time duration.

12. A system comprising:
    a host device comprising a first reset output port and a data interface;
    a non-volatile memory circuit;
    a cache memory circuit;
    a storage controller comprising a data port coupled to the host device using the data interface, a second reset input port, and a processor configured to execute instructions to perform operations using the non-volatile memory circuit and the cache memory circuit; and
    reset logic including a first reset input port and a second reset output port, the first reset input port of the reset logic coupled to the first reset output port of the host device, and the second reset output port of the reset logic coupled to the second reset input port of the storage controller, the reset logic configured to:
    receive a first reset signal from the host device;
    actuate a timer, the timer configured to cause the storage controller to execute a reset routine after a specified threshold time duration;
    initiate transfer of data from the cache memory circuit to the non-volatile memory circuit; and
    responsive to expiration of the timer, provide a second reset signal to the second reset input port of the storage controller to initiate the reset routine.

13. The system of claim 12, comprising a memory device that includes the non-volatile memory circuit, the cache memory circuit, the storage controller, and the reset logic.

14. The system of claim 13, wherein the cache memory circuit comprises a portion of the storage controller and is configured to temporarily store information received from the host device via the data interface before the information is transferred to the non-volatile memory circuit.

15. The system of claim 12, wherein the reset logic is configured to provide an interrupt signal to an interrupt input port of the storage controller in response to receiving the first reset signal; and
    responsive to the interrupt signal, the storage controller is configured to interrupt a current routine of the processor and initiate the reset routine.

16. The system of claim 15, wherein the reset routine includes a data flush routine to transfer data from the cache memory circuit to the non-volatile memory circuit.

17. The system of claim 15, wherein responsive to the interrupt signal, the storage controller is configured to provide a disable command to a disable input port of the reset logic and, in response to the disable command, the reset logic is configured to deactivate the timer.

18. The system of claim 12, wherein the reset logic comprises a disable input port, wherein the storage controller comprises a timer disable output port coupled to the disable input port of the reset logic, and wherein the storage controller is configured to provide a timer disable signal to the disable input port of the reset logic to disable the timer.

19. A circuit comprising:
    reset logic for a memory device, the reset logic including a first reset input pin, a timer disable input pin, an interrupt signal output pin, and a reset output pin, wherein the reset logic is configured to:
    receive, at the first reset input pin, a first reset signal from a memory host device;
    actuate a timer in response to receiving the first reset signal, the timer configured to cause the memory device to reset after a specified threshold time duration;

initiate transfer of data from a volatile memory to a non-volatile memory; and responsive to expiration of the timer, provide a second reset signal using the reset output pin to trigger reset of the memory device.

20. The circuit of claim 19, further comprising a controller for the memory device, wherein the reset logic is configured to provide, using the interrupt signal output pin, an interrupt signal to an interrupt input pin of the controller in response to receiving the first reset signal at the first reset input pin; and responsive to the interrupt signal, the controller is configured to interrupt a current routine of the memory device and initiate a reset routine of the memory device, or deactivate the timer, or reset the memory device after transferring data from the volatile memory to the non-volatile memory.

* * * * *